May 28, 1963  J. R. H. BOUTEFOY  3,091,449
TELESCOPIC SHOCK ABSORBERS
Filed Oct. 23, 1961
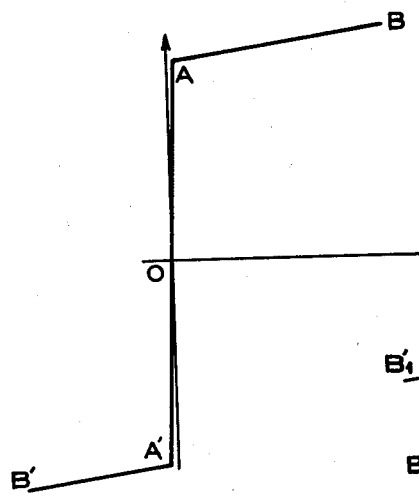
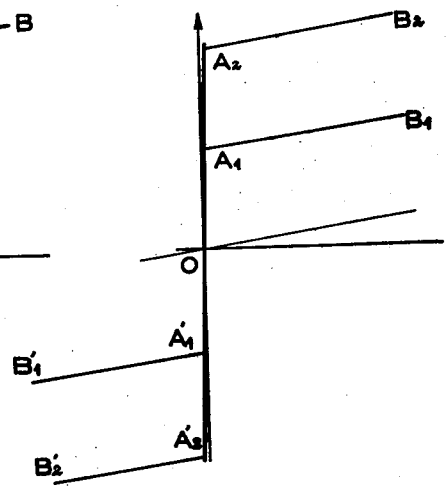
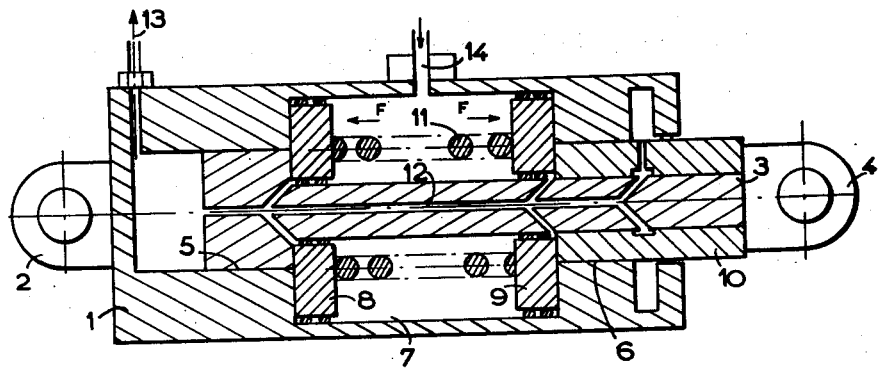
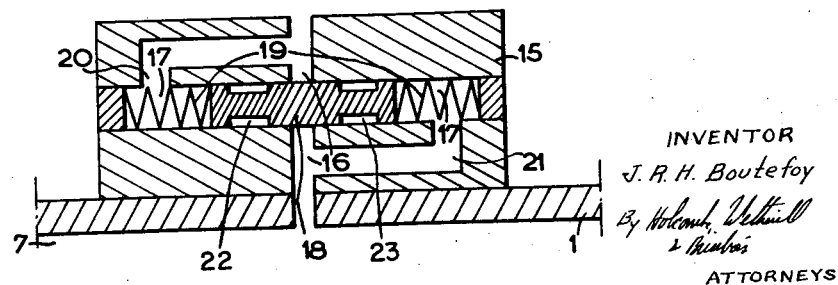
INVENTOR
J. R. H. Boutefoy
ATTORNEYS United States Patent Office 3,091,449
Patented May 28, 1963

3,091,449
TELESCOPIC SHOCK ABSORBERS
Jean Rene Henri Boutefoy, Neuilly-sur-Seine, France, assignor to Societe Generale de Constructions Electriques et Mecaniques (Alsthom), Paris, France, a French body corporate
Filed Oct. 23, 1961, Ser. No. 146,807
Claims priority, application France Oct. 26, 1960
1 Claim. (Cl. 267—67)

The present invention relates to telescopic shock absorbers, and has for an object, improvements therein.

The use of telescopic shock absorbers for vehicle suspensions, particularly railroad vehicles, is well known: they behave as rigid rods when the force upon them is small; but like a flexible tie-rod when the force is above a certain arbitrarily fixed value, and which is referred to as the "initial tension." This "initial tension" is obtained by means of a flexible member mounted in the body of the shock absorber and in the form of a leaf or helical spring, precompressed to a value corresponding to the "initial tension" required; compression or tractive forces exceeding the initial pressure bring about a set of the spring, always in the same direction, which, particularly in the case of a helical spring, is generally compression. It will be apparent that the length of the tie-rod can only vary if the force acting upon it, whether traction or compression, exceeds the precompression force of the spring.

Such a tie-rod or shock absorber is also referred to as a strain limiting device, and has an elastic characteristic which will be referred to later. Generally however, for a variation of the length of a given tie-rod, the strain transmitted is limited, more or less, to the value of the initial tension.

A tie-rod of this kind is particularly useful in the case where a great initial force is required under normal operating conditions but where under exceptional conditions, the magnitude of this force may possibly break certain members if it rises above a predetermined limit.

But with a given spring and a given adjustment, it is only possible to obtain one value for the initial force and one value of flexibility during use; and these values can only be altered if the tie-rod is taken apart.

Furthermore, it frequently happens that a weak initial force is necessary under normal running conditions but this becomes insufficient in certain exceptional cases.

It occurs, for example, in the transverse suspension of a vehicle; for reasons of comfort it is desirable to have a weak initial force and flexible suspension. It is not always possible to fully satisfy this requirement because of the transverse displacement of the suspended part which can occasionally be excessive, for example in days of high wind or gales.

In vertical suspension too, one can limit the flexibility of a suspension to take into account certain conditions of exceptional overload.

The present invention has for an object a new telescopic shock absorber in which it is possible to transfer to the tie-rod linkage between two bodies (such as the wheels and the body of the vehicle) initial forces and flexibilities which are adjustable as required under service conditions, and yet with reasonable shock absorption. This new absorber is characterized in that the initial tension and flexibility are determined by the pressure of a fluid and by the variation of this pressure under the action of a control device exterior thereto and that the movement is absorbed by the throttling of a conduit in which the fluid circulates.

In order that the invention may be more clearly understood, reference will now be made to the accompanying drawings which show some embodiments thereof and some explanatory diagrams, purely by way of example, and in which:

FIGURE 1 shows a graph of force against displacement of a strain-limiting device, FIGURE 2 shows a section through one embodiment of shock absorber, FIGURE 3 shows a graph of force against displacement of an absorber with a given spring, and FIGURE 4 shows a cross-section of a valve for fitting to the absorber of FIGURE 2.

Referring to the drawings, FIGURE 1 shows a graph of the elastic characteristics of a strain-limiting device as referred to above, and relating to the device of FIGURE 2, where the force, or strain is plotted as ordinates and the displacement of the tie-rod absorber as abscissae. The points OA, OA' of the graph correspond to the initial tension of the rod and the points AB, AB', which have a small slope, correspond to a great flexibility of the spring. As referred to above, for a variation of tie-rod lengths (displacement) the strain or force transmitted is limited, more or less, to the value of the initial tension.

FIGURE 2 shows a cross-section of a telescopic shock absorber in accordance with the invention. This absorber comprises a sleeve 1 integral with an articulation eye 2, and through which runs a rod 3 integral with an articulation eye 4. The movement of the spindle 3 within the sleeve 1 is guided by bearings 5 and 6, between which is a chamber 7 defined between two pistons 8 and 9. In equilibrium these pistons rest simultaneously on the sleeve 1 and the spindle 3 or on a part 10 secured thereto.

At the interior of this chamber 7 is a spring 11, and the device thus constituted is a telescopic shock absorber or flexible tie-rod with a practically constant initial tension which is equal to the precompression force or strain of the spring; its elastic characteristics are those shown in FIGURE 1.

The flexibility of the spring 11 and its precompression can be adjusted in such a way that the required flexibility can be obtained; nevertheless the spring can be omitted if required.

In accordance with the invention, the chamber 7 is, in fact, filled with a fluid such as oil, water, an elastomer or even just air; conduits 12 ensure the distribution of the fluid inside the absorber, whereas an expansion valve not shown, but of any known kind, connected to the orifice 13 compensates the variations of total volume which take place during use.

The fluid within the chamber 7 is put under pressure by means of a device, not shown on the figure but including, in principle, a pump and a reservoir, and this fluid is admitted by the orifice 14 into the chamber 7 through a regulating valve. The fluid acts upon the two pistons 8 and 9 and tends to separate these with a force F proportional to its pressure. It is seen that the length of the absorber can only vary in length if a strain greater than the force exerted on the pistons 8 and 9 by the pressure of the fluid and by the spring, if provided, is exerted on it.

The initial tension of the absorber is adjustable as a function of the pressure of the fluid admitted; it can be nil if the pressure of the fluid admitted is nil and the spring 11 is not used.

The elastic characteristic of an absorber with a given spring is shown in the graph of FIGURE 3 where the strains appear as ordinates and the displacements as abscissae. For small constant pressure of the fluid, for example, the characteristic $OA_1B_1$—$OA'_1B'_1$ is obtained. For a constant maximum pressure, for instance, the characteristic $OA_2B_2$—$OA'_2B'_2$ is obtained. In the absence of the spring 11, the part AB—A′B′ of the characteristic is horizontal.

If the strain exerted on the rod is less than the value shown in FIGURE 3 at $OA_2$, either a flexible connection or an infinitely rigid connection can be obtained at will, by acting upon the fluid pressure regulator outside the device.

In accordance with the invention, it is also possible to add a special valve to the device such as the one shown on FIGURE 4, fitted, for example, at the intake 14. This valve, as will be demonstrated, absorbs the movements relative to the two extremities of the absorber or tie-rod, when such relative movements are likely to occur due to the pressure of the fluid in the interior of the chamber 7 being reduced.

This valve comprises a member 15 fixed to the sleeve 1 of the shock absorber or else connected thereto by means of a flexible pipe said member 15 being bored mutually at right angles at 16 and 17; bore 16 serves for the passage of the fluid, and the bore 17 contains a slide valve 18 which is kept in normal position by two counter-acting springs 19. These two springs 19 are each located in a chamber one side 20 of which communicates with the feed pressure and the other side 21 of which is in communication with the pressure in chamber 7 of the absorber. The displacement of the slide valve is proportional to the difference in pressure existing between the chamber 7 and the feed. The fluid passes from chamber 7 to the feed and inversely by conduit 16 and flows laminarly around slide valve 18. The shape of slide valve 18 is such that the section of fluid passing through conduit 16 around slide valve 18 increases with the displacement of the slide valve. In the example shown in FIGURE 4 this increase in the section of the fluid passage is obtained by means of circular grooves 22 and 23. In the position of slide valve 18 shown in FIGURE 4, the conduit 16 is blocked by the slide valve 18. If a force which tends to move the rod away from its central position shown in FIGURE 2 is exerted between the articulations 2 and 4, an increase in the pressure of the fluid located in the chamber 7, in communication with space 21, is caused. The slide valve 18 is displaced towards the left and a fluid passage is opened in the conduit 16 when the latter is reached by the right hand groove 23.

If, however, the rod tends to return to its central position the pressure of the fluid in chamber 7 and space 21 drops below the pressure of the fluid source exerted at 20. The slide valve 18 is displaced towards the right and a fluid passage opens in the conduit 16 when the latter is reached by the left hand groove 22.

In both cases the fluid passage in conduit 16 varies in size according to the degree to which the slide valve 18 has been thrust to the left or to the right, that is according to the difference in pressure between the space 21 and the space 20. A reaction is thus obtained which varies in the same manner as the displacement speed of the fluid i.e. to a greater or lesser extent according to whether the speed of variation of the rod length is itself larger or smaller.

This valve has the advantage of containing only one adjustment, which makes it possible to ensure uniformity of operation of the shock absorber in the two directions of displacement. It is nevertheless, possible to use a valve having a plurality of slide valves. The slide valves may, if required, be placed in the interior of pistons 8 and 9.

Furthermore, the feed pressure of the fluid can be controlled by any automatic device, and particularly a device responsive to the length variation of the absorber. Such a system makes it possible to obtain a rapidly increasing reaction as a function of the length variation of the absorber; it is to some extent a corresponding thrust movement.

I claim:

A telescopic shock absorber comprising an outer casing, shoulders in said casing defining a chamber in the centre of said casing, an inner rod slidable within said casing, the central part of the said inner rod being reduced to form axially separated shoulders, two pistons located around said inner rod and within said chamber and being slidable on said inner rod and in said casing, a source of fluid under pressure outside said casing, a conduit connecting said source to said outer casing for conveying said fluid into said chamber to urge said pistons apart and enabling it to return to the said source, a slide valve case arranged in said conduit and a slide valve movable in the slide valve case in order to open a passage of variable section in said conduit for said fluid, movement of said slide valve being caused by the differential action exerted by the pressure of the said fluid in said source and by the pressure of the said fluid in said chamber.

References Cited in the file of this patent

UNITED STATES PATENTS

| 2,723,847 | Hogan | Nov. 15, 1955 |
| 2,729,440 | Wales | Jan. 3, 1956 |

FOREIGN PATENTS

| 849,044 | Germany | Sept. 11, 1952 |
| 1,147,874 | France | June 11, 1957 |
| 71,117 | France | Mar. 31, 1959 |

(1st addition to 1,149,905)